United States Patent [19]
Houdard

[11] 4,286,326
[45] Aug. 25, 1981

[54] DIGITAL DEVICES FOR SPECTRUM ANALYSIS

[75] Inventor: Jean P. Houdard, Orsay, France

[73] Assignee: Le Materiel Telephonique, Boulogne-Billancourt, France

[21] Appl. No.: 32,379

[22] Filed: Apr. 23, 1979

[30] Foreign Application Priority Data

Apr. 27, 1978 [FR] France .................. 78 12477

[51] Int. Cl.³ .......................................... G06F 15/31
[52] U.S. Cl. ............................. 364/485; 179/84 VF; 324/77 B; 364/715
[58] Field of Search ................. 364/485, 483, 715; 324/77 B, 77 R; 179/1 SA, 1 SC, 84 VF

[56] References Cited

U.S. PATENT DOCUMENTS

| | | | |
|---|---|---|---|
| 3,466,431 | 9/1969 | Fuchs et al. | 364/485 |
| 3,573,446 | 4/1971 | Bergland | 364/485 X |
| 3,881,097 | 4/1975 | Lehmann | 364/485 X |
| 3,903,401 | 9/1975 | Jayant | 364/485 |
| 3,920,978 | 11/1975 | Schmitt et al. | 364/485 X |
| 4,080,516 | 3/1978 | Kuwahara | 179/84 VF |
| 4,093,989 | 6/1978 | Fink et al. | 364/485 |
| 4,157,457 | 6/1979 | Sakoe et al. | 364/485 X |

Primary Examiner—Edward J. Wise
Attorney, Agent, or Firm—Roland Plottel

[57] ABSTRACT

This invention relates to digital devices for spectral analysis.

Signal x(t) of spectrum X(f), sampled at frequency 1/T and encoded, is processed by a temporal digital filter having a width NT followed by one or more perfect digital resonators in parallel, each tuned to a specific predetermined frequency $f_p$ and possessing two outputs, one being the "sine" output and the other being the "cosine" output on which the digital signals $X(f_p) \sin 2\pi f_p kT$ and $X(f_p) \cos 2\pi f_p kT$ are obtained after time NT, from which the value $X^2(f_p)$ can be formed by conventional digital processing.

Application to encoded multifrequency signal receivers used in telephone switching.

6 Claims, 7 Drawing Figures

DIGITAL DEVICES FOR SPECTRUM ANALYSIS

BACKGROUND OF THE INVENTION (a) Field of the Invention

The present invention relates to methods and apparatus for measuring the power or amplitude densities of the spectral components of a digital signal comprising a sequence of numbers x(nT), where T is the sampling period and n is the rank of the sample. The technique disclosed applies to either signals naturally limited in time of interval $\rho = NT$, or signals of unlimited duration previously subjected to temporal filtering of interval $\rho$.

(b) Discussion of the Prior Art

Known procedures for measuring the power spectral density of digital signals most often use methods which are based on either selective filtering, followed by quadratic integration, or on a calculation of the discrete Fourier transform (DFT) of the signal to be analyzed. The major disadvantage of these latter methods—apart from the complexity of implementation when N is large—is that they allow analysis of the spectrum only for frequencies which are multiples of 1/NT.

SUMMARY OF THE INVENTION

As a solution to these and other problems the instant invention comprises methods and apparatus for measuring the spectral density specific to a signal x(t), i.e. the autospectrum.

Methods and apparatus are also disclosed for measuring the interaction spectral density, i.e. the interspectrum, of two signals x(t) and x'(t).

Yet another embodiment of the invention discloses methods and apparatus for recognizing and measuring the levels or amplitudes of sinusoidal frequencies $f_1, f_2 \ldots f_q$ used in multifrequency signalling devices, especially for signalling between automatic telephone exchanges (e.g. the so-called R$_2$ Code and SOCOTEL M.F. Code), or between subscribers and telephone exchanges (e.g. multifrequency Codes).

Among the advantages of the present invention are the following (1) the length (NT) of the sequences to be processed can have any value;

(2) the analyzer disclosed allows the measurement of the spectral density associated with a frequency f, a group of frequencies f, or all the frequencies in the range $0 < f < 1/2T$;

(3) the frequencies, f are not necessarily special frequencies as in the case of digital analyzers using the DFT method ($f = r/NT$, where $0 \leq r \leq N-1$); they may in fact, have any value;

(4) in the case of signals of finite duration, it is possible to refine the analysis to any required extent; in other words, the frequency resolving power threshold level $\Delta f = 1/\tau$, which limits the performance of conventional analyzers, can be improved by increasing N, at least each time it is required to perform the measurement over a sufficiently long interval $\tau$;

(5) the analyzer disclosed is well suited for the automatic and programmed processing of signals.

The apparatus of the present invention uses algorithms which are based on the theory of the z-transform, i.e. $[z = \exp(sT)]$, which is a special case of the Laplace transform the symbolic variable s applied to temporal functions sampled at the frequency $F_e = 1/T$.

The methods used are an application of Plancherel's theorem which states that the Fourier transform, the Laplace transform or the z-transform of the convolution of two signals is equal to the product of their individual transforms, i.e. in the case of a Fourier transform, for example:

$$x(t) * y(t) \rightleftharpoons X(f) \cdot Y(f)$$

and reciprocally:

$$x(t) \cdot y(t) \rightleftharpoons X(f) * Y(f)$$

For the sake of clarity, the sampled temporal functions and their transforms are represented by x*(t) and X*(f) in the following discussion.

The theoretical considerations upon which the present invention is based are developed in the following books:

(1) "Digital Processing of Signals" by B. Gold and Ch. M. Rader, published by McGraw-Hill, New York, (1969);

"Méthodes et Techniques de Traitement du Signal et Applications aux Mesures Physiques" by J. Max, edited by Masson (2nd edition, 1977).

And its mode of operation will be more fully understood from the following detailed description when taken with the appended drawings in which:

As will be subsequently explained, the illustrative analyzing device disclosed and claimed herein includes:

(a) a temporal digital filter of width $\tau = NT$ comprising a gate—or limiting window—of appropriate shape whose input is fed with the signal x(t) to be analyzed, which signal was previously sampled at the frequency $F_e = 1/T$ and linearly quantified and encoded;

(b) one or more digital filters used sequentially, or simultaneously in parallel, each representing a perfect resonator tuned to a predetermined frequency $f_p = f_1, f_2 \ldots$ or $f_q$, each frequency filter being provided with an input fed with the signal obtained from the temporal digital filter and either one output providing, when $k \geq N$, the signal $X(f_p) \sin 2\pi f_p kT$ or $X(f_p) \cos 2\pi f_p kT$, as required, or two outputs, known as "cosine" and "sine" outputs, producing the signals $y_r = X(f_p) \cos 2\pi f_p kT$ and $y_s = X(f_p) \sin 2\pi f_p kT$, when $k \geq N$, $X(f_p)$ representing the module of the frequency component $f_p$ of the signal x(t) to be analyzed.

Theoretically, each of the perfect resonators comprises essentially of a recursive digital filter having the following transfer function, expressed in terms of z:

$$H_p^*(z) = \frac{1}{1 - \exp(j2\pi f_p T) z^{-1}}$$

The pulse response $h_p^*(t)$ of such a filter is the inverse transform of $H_p^*(z)$, i.e. the unlimited series $h_p^*(kT) = \exp(j2\pi f_p kT)$, with $k \geq 0$.

In order to state the principal operating main characteristic of the instant invention in as precise a manner as possible, it may be said that the instant invention produces the convolute of signal $e^*(t)$ produced by the temporal digital filter and of $h_p^*(kT)$ to produce the temporal signals required on the resonator outputs:

$$y_p^*(kT) = e^*(t) * h_p^*(kT)$$

Representing the z-transform of $y_p^*(kT)$ by $Y_p^*(z)$, and the z-transform of $e^*(t)$ by $E^*(z)$, Plancherel's theorem gives:

$$Y_p^*(z) = E^*(z) \cdot H_p^*(z)$$

According to one characteristic aspect of the present invention, relating specifically to devices for measuring the spectral density of one signal x(t), each of the perfect resonators is provided with two outputs (e.g. "cosine" and "sine") associated with two digital multipliers producing $X^2(f_p) \sin^2 2\pi f_p kT$ and $X^2(f_p) \cos^2 2\pi f_p kT$ for $k \geq N$, the multiplier outputs being connected to an adder which produces $X^2(f_p)$.

According to another characteristic aspect of the invention, specific to devices for measuring the interaction spectral density of two signals x(t) and x'(t), the latter are first individually processed after sampling by two groups of identical circuits, each comprising of:
(a) a temporal digital filter of width $\tau = NT$;
(b) one or more frequency digital filters behaving as perfect resonators and tuned to frequencies $f_p(f_1, f_2 \ldots f_q)$ used either sequentially or simultaneously in parallel, but each possessing both "consine" and "sine" outputs.

The following signals are obtained for $k \geq N$ at the outputs of a perfect resonator of the first group processing x(t):

$$y_r^* = X(f_p) \cos 2\pi f_p kT \text{ and } y_s^* = X(f_p) \sin 2\pi f_p kT,$$

while the following signals are obtained for $k \geq N$ at the outputs of the conjugate perfect resonator of the second group processing x'(t):

$$(y_r^*)' = X'(f_p) \cos(2\pi f_p kT - \phi)$$

and $(y_s^*)' = X'(f_p) \sin(2\pi f_p kT - \phi)$, where $X_p(f)$ and $X'(f_p)$ are the moduli of the frequency components $f_p$ in signals x(t) and x'(t) and $\phi$ is the phase difference between these components.

As will be explained, four digital multipliers are associated with each pair of conjugate resonators, each digital multiplier having two inputs fed with the following:
the first multiplier: $y_r^*$ and $(y_r^*)'$,
the second multiplier: $y_s^*$ and $(y_s^*)'$,
the third multiplier: $y_s^*$ and $(y_r^*)'$,
and the fourth multiplier: $y_r^*$ and $(y_s^*)'$.

The outputs of the first and second multipliers are associated with a digital adder, producing:

$$R_p = y_r^* \cdot (y_r^*)' + y_s^* \cdot (y_s^*)' = X(f_p) \cdot X'(f_p) \cos \phi.$$

The outputs of the third and fourth multipliers are associated with a digital subtractor, producing:

$$I_p = y_r^* \cdot (y_s^*)' - y_s^* \cdot (y_r^*)' = X(f_p) \cdot X'(f_p) \sin \phi.$$

$R_p$ and $I_p$ are the values required; they respectively represent the real or in-phase component and the imaginary or quadrature component of the interaction spectral density of x(t) and x'(t) at frequency $f_p$.

The analyzing devices in accordance with the present invention can be applied, in principle, to any signal x(t) satisfying the following conditions:
(1) the signal is bounded;

(2) $\int_{-\infty}^{+\infty} x(t)$ is finite;

(3) the number of discontinuities in x(t), as well as of the number of maxima and minima, is finite;
(4) the spectrum of x(t) is limited, i.e. the transform X(f) is zero outside of the interval $-F_M$ to $+F_M$.

In order to apply the invention, signal x(t)—if not already so—is sampled at the frequency $F_e = 1/T$, where $F_e > 2F_M$, and linearly quantized and encoded to produce a digital series designated resin as $x^*(nT)$. The latter passed through a temporal digital filter of width $\tau = NT$ comprising a limiting window which weights the samples as a function of their rank n ($0 < n < N - 1$).

If the weighting law is represented by u(NT), the following signal is obtained at the temporal filter output:

$$e^*(nT) = x^*(nT) \cdot u(nT) \quad (0 \leq n \leq N-1)$$

It may be noted in passing, that the use of a temporal digital filter allows the processing of signals x(t), such as $x(t) = A_p \sin 2\pi f_p t$, which do not satisfy condition (3) above.

If $E^*(f)$, $X^*(f)$ and U(f) are the transforms of $e^*$, $x^*$ and u, respectively, Plancherel's theorem gives:

$$E^*(f) = X^*(f) * U(f)$$

Because of the importance of the limiting window when applying the invention, it is useful to examine its structure in greater detail.

Function U(f) naturally depends on the interval $\tau = NT$, but above all, on the mathematical representation of u(nT), or of u(t) in continuous time.

If a simpler window is used, i.e. a square window defined by:

$$u(t) = 1 \text{ for } -(\tau/2) \leq t \leq (\tau/2)$$

$$u(t) = 0 \text{ for } |t| \geq (\tau/2)$$

the transform U(f) is written:

$$U(f) = \tau (\sin \pi f \tau / \pi f \tau)$$

U(f) has a main peak of maximum amplitude $G_0 = \tau$ for $f = 0$ and a total width $\Delta f_0 = 2/\tau$, and secondary peaks of width $1/\tau$, alternately negative and positive of slowly decreasing levels ($-13$ dB, $-18$ dB, etc.). In most cases it is preferable to use a window producing acceptable secondary peak levels in order to reduce interference between signals belonging to different bands of the spectrum.

It should also be noted that the variation of U(f), as a function of any error $\delta f$ close to $f=0$, should not be too great. If the application to the reception of multifrequency signals is considered, the constituent frequencies of $f_p$ are defined with a tolerance of $\pm \Delta f_p$, and since the corresponding perfect resonator is tuned to the nominal frequency $f_p$, an error occurs in the measurement of $X(f_p)$.

The ideal spectrum should be rectangular, such that $U(f) = \tau$ for $-1/\tau \leq f \leq 1/\tau$ and $U(f) = 0$ outside of these limits.

The corresponding temporal gate or window is theoretically defined by the law:

$$u(t) = \frac{\sin 2\pi \frac{t}{\tau}}{2\pi \frac{t}{\tau}}$$

This is not possible, since it is of infinite duration.

It is seen, however, that u(t) has a main temporal peak of width $2\tau$ and decreasing-amplitude secondary peaks of width $\tau$.

A certain number of digital gates providing a compromise between the rectangular temporal gate and the theoretical rectangular spectrum gate are technically available.

In certain practical cases, the compromise consists of forming the time gate of total width $\tau$ by superpositioning $k+1$ truncated cosinusoidal gates of frequencies $(k/\tau)$ ($k = 0, 1, 2$, etc.) and amplitudes $a_0, a_1 \ldots a_k$, where $a_0 + a_1 + \ldots + a_k = 1$.

A cosinusoidal gate of frequency $k/\tau$ has a spectrum with two main peaks centered on frequencies $\pm k/\tau$ and whose amplitudes have the sign $(-1)^k$. It may be considered that these cosinusoidal gate main peaks correspond to the secondary peaks of the rectangular gate spectrum with equal amplitudes and opposite signs.

Remembering that the Fourier transform is a linear function, it is seen that the resulting spectrum is the sum of the component gate spectra.

By adjusting the number k and the values of $a_0, a_1 \ldots a_k$, it is thus possible to obtain considerably reduced secondary peaks because of the compensations of signs between the peaks of the different temporal components. This advantage is sometimes accompanied by widening of the resulting main peak.

Among gates of this type which are currently in use, the following may be mentioned:
(a) The Hamming gate expressed by:

$$u_H(t) = 0.54 + 0.46 \cos 2\pi(t/\tau)$$

where, $-\tau/2 \leq t \leq \tau/2$

The main peak has a total width of $2\Delta f_H = 4\Delta f_0 = 4/\tau$ and a maximum amplitude $G_H = 0.54\tau$. The secondary peak levels are at least 40 dB smaller; and
(b) The Blackman gate expressed by:

$$u_B(t) = 0.42 + 0.5 \cos (2\pi t/\tau) + 0.08 \cos (4\pi t/\tau)$$

where $-\tau/2 \leq t \leq \tau/2$.

The main peak has a total width of $2\Delta f_B = 6\Delta f_0 = 6/\tau$ and a maximum amplitude $G_B = 0.42 \tau$. The secondary peak levels are at least 80 dB smaller.

The time t is quantized and measured in multiples nT. The limiting gate or window opens for $n=0$ and closes for $n = N-1$.

This, therefore, produces:

$$u_H(nT) = 0.54 - 0.46 \cos 2\pi(n/N) \quad (0 < n < N-1)$$

and $$u_B(nT) = 0.42 - 0.5 \cos 2\pi(n/N) + 0.08 \cos 4\pi(n/N)$$
$$(0 < n < N-1)$$

The weight given to the amplitude of each sample, as a function of its rank n, is determined by the above formulae.

When measuring the spectral levels for the nominal frequencies $f_i$ and $f_j$, the frequency error between the main peak centre-frequency and either edge of infinite attenuation must not exceed $\Delta f_{ij} = |f_i - f_j|$. In other words, in the case of a Hamming gate: $\tau_H = NT \geq (2/\Delta f_{ij})$, and in the case of a Blackman gate: $\tau_B = NT \geq 3/\Delta f_{ij}$.

Moreover, if frequencies $f_i$ and $f_j$ of the measured spectrum are defined with a tolerance of $\pm \Delta f_p$, the minimum widths of the gates are again increased and become:

$$\tau_H' = NT \geq \frac{2}{\Delta f_{ij} - \Delta f_p}$$

and $$\tau_B' = NT \geq \frac{3}{\Delta f_{ij} - \Delta f_p}$$

In the case of reception of multifrequency signals, using the SOCOTEL M.F. code as an example, the frequencies are spaced 200 Hz apart and each is defined with a tolerance of $\pm 20$ Hz. This therefore gives:

$\tau_H' \geq 11$ ms $\tau_B' \geq 16.5$ ms i.e. with $T = 0.125$ ms, respectively:

$N' = 88$ and $N' = 132$.

If these results are considered, it is seen that the temporal gate duration $\tau$ for a spectrum of total given width of 2 $\Delta F$ increases as the tolerated secondary peak levels decrease.

It is, therefore, possible to write:

$$\Delta F = \frac{\alpha}{\tau} \begin{cases} \alpha = 1 \text{ for the square gate} \\ \alpha = 2 \text{ for the Hamming gate} \\ \alpha = 3 \text{ for the Blackman gate} \end{cases}$$

There are many other types of gates, such as those which can be synthesized from the required spectrum shape. In particular, mention may be made of the transformed gates of a Tchebyscheff filter lying within the following shape in which the positive values of f (half-spectrum) only are considered:

$A_{max}$ dB in the pass-band $\Delta f_p$ $A_{min}$ dB in the attenuated band beyond $\Delta f_{ij} - \Delta f_p$.

In the case of application to the SOCOTEL M.F. system with:

$A_{max} = 0.2$ dB within $\Delta f_p = 20$ Hz $A_{min} = 38$ db beyond $f = 180$ Hz ($\Delta F$)

the value obtained is $\tau = 9$ ms.

The formula $\Delta F = \alpha/\tau$ gives $\alpha = 1.6$.

With respect to the width $\tau$, it is seen that the Tchebyscheff gate lies between the rectangular gate ($\alpha = 1$) and the Hamming gate. The same applies to the power lost in the secondary peaks, since the Tchebyscheff filter possesses a large number of peaks having maximum levels of $-A_{min}$ in the attenuated band, whilst the spectrum of the Hamming gate possesses a limited number of secondary peaks of significant amplitude, the remaining peaks rapidly decreasing beyond the third.

Finally, the choice of gate depends on a compromise between the required accuracy of spectral power measurement and the duration of measurement. If high accuracy is required, whilst avoiding the effect of interference due to secondary peaks, it is preferable to use a Blackman gate ($\alpha = $ approximately 3). If a short duration, is required however, it is preferable to adopt a gate of the Tchebyscheff type ($\alpha = $ approximately 1.5).

Theory makes it possible to represent the parallel evolution of digital signals and their transforms from $x(t)$ to $e^*(nT)$ and $X(f)$ to $E^*(f)$.

The detailed description of the invention which will now be given uses graphical representations in preference to a mathematical development which, although more rigorous, tends to mask physical realities because of its rather complex symbolism.

Moreover, for the sake of clarity, we shall assume the use of a signal $x(t)$ whose spectrum contains only two discrete frequencies $f_i$ and $f_j$, i.e.:

$$x(t) = X_i \sin 2\pi f_i t + X_j \sin (2\pi f_j t - \phi_{ij})$$

Extension to a signal containing a higher number of discrete frequencies or a continuous-spectrum signal is simple.

Figure 1A:
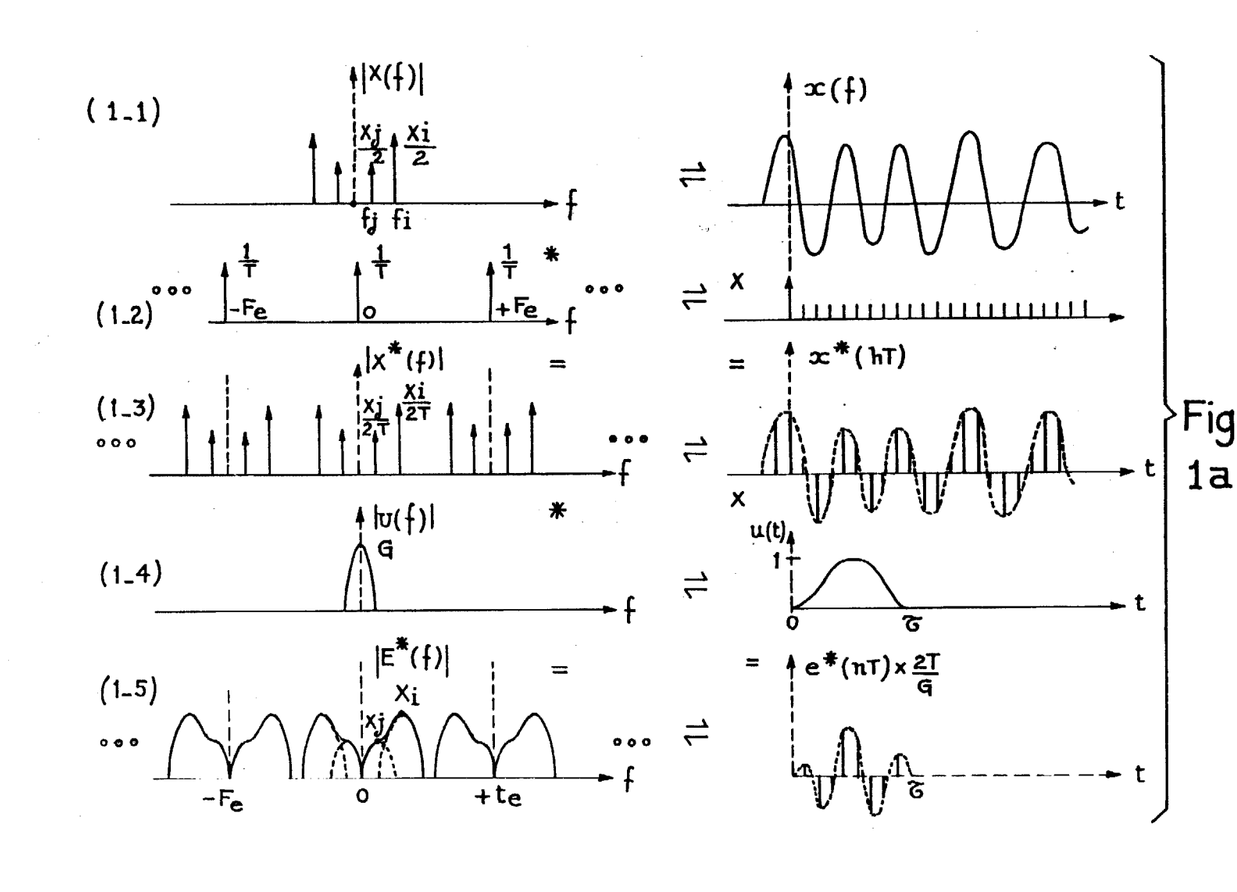
FIGS. 1a and 1b are a set of graphs showing the parallel evolution of a temporal signal and its frequency transform when being processed by a device in accordance with the present invention.

In the drawings the right-hand column in FIG. 1a illustrates the evolutionary stages of signal $x(t)$, whilst the left-hand column illustrates those of the spectral transform $x(t)$.

These parallel evolutions are analyzed as follows:

In Diagram 1-1, signal $x(t)$, theoretically unlimited in time, is shown on the right. The spectrum $X(f)$, consisting of four components $\pm f_i$ and $\pm f_j$ of amplitudes $X_i/2$ and $X_j/2$ is shown on the left.

In Diagram 1-2, the Dirac temporal train of period T, and expressed by $$\sum_{\lambda = -\infty}^{\infty} \delta(t - \lambda T),$$

is shown on the right. Its spectral transform, i.e. the Dirac frequency series of period $F_e = 1/T$ and expressed by $$\frac{1}{T} \sum_{\lambda = -\infty}^{\infty} \delta\left(f - \frac{\lambda}{T}\right)$$

is seen on the left, but limited because of drawing limitations to the three components corresponding to $\lambda = -1$, $\lambda = 0$ and $\lambda = 1$.

In Diagram 1-3, the simple product of $x(t)$ and the Dirac temporal train, i.e. $x^*(nT)$, is shown on the right. The modulus of $X^*(f)$, the transform of $x^*(nT)$—which is the product of convolution of $X(f)$ and the Dirac frequency series—is shown on the left. This is a group of line spectra, each spectrum possessing four lines of frequencies $\lambda F_e \pm f_i$ and $\lambda F_e \pm f_j$ and of amplitudes $X_i/2T$ (for $f_i$) and $X_j/2T$ (for $f_j$).

In Diagram 1-4, the limiting gate of law u(t) for $0 \leq t \leq \tau$ is shown on the right, whilst its continuous spectrum U(f) of maximum amplitude G for f=0 is seen on the left. Since amplitudes $X_i$ and $X_j$ assigned to frequencies $f_i$ and $f_j$ should finally be obtained in the remainder of the spectral transformations, the samples u(nT) defining the limiting gate are all multiplied by 2T/G.

In Diagram 1-5, the simple product of $e^*(nT)$ of $u(nT)$ and $x^*(nT)$ is shown on the right, whilst the modulus of the product of convolution $e^*(f)$ of $u(f)$ and $X^*(f)$ is seen on the left. In this case, this is a multiband spectrum derived from the line spectrum of diagram 1-3 in which, neglecting the presence of the secondary peaks of spectrum U(f), each line is surrounded by a specific band having a total width of $2\alpha/\tau$. The amplitudes corresponding to frequencies $\lambda F_e \pm f_i$ and $\lambda F_e \pm f_j$ are $X_i$ and $X_j$ respectively if the characteristics of the gate are those indicated above.

The following Diagrams 1-6, 1-7, etc., shown in FIG. 1b will be explained in the remainder of the detailed description.

The signal processed by the perfect resonator or resonators tuned to frequency $f_p$ is $2T/Ge^*(nT)$.

Figure 2:
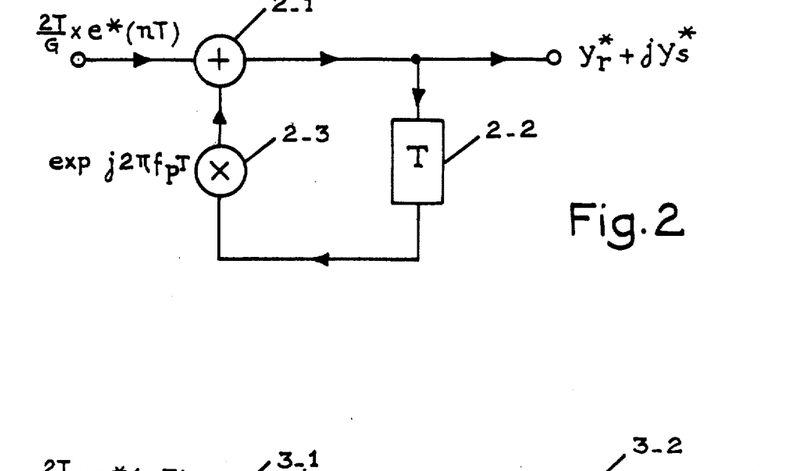
FIGS. 2 and 3 are block schematic diagrams of perfect resonators for use in a device according to the present invention.

A resonator of theoretically perfect structure is shown in FIG. 2. It comprises of:

a digital adder 2-1 with two inputs, one input being fed with the signal $2T/Ge^*(nT)$, and one output;

a delay circuit 2-2 producing the unit delay T connected between the output of adder 2-1 and the input of a multiplier 2-3 having a multiplication factor of $\exp(j2\pi f_p)$, whose output is connected to the other input of adder 2-1.

The required signal $(y_4^* + jy_s^*)$ is obtained on the "complex" output of adder 2-1.

The transfer function of the perfect resonator illustrated by FIG. 2 is written as follows:

$$H_p^*(z) = \frac{1}{1 - \exp(2\pi f_p T) \cdot z^{-1}}$$

with the following pulse response:

$$h_p^*(kT) = \exp(j2\pi f_p kT) = \cos 2\pi f_p kT + j \sin 2\pi f_p kT$$

Figure 3:
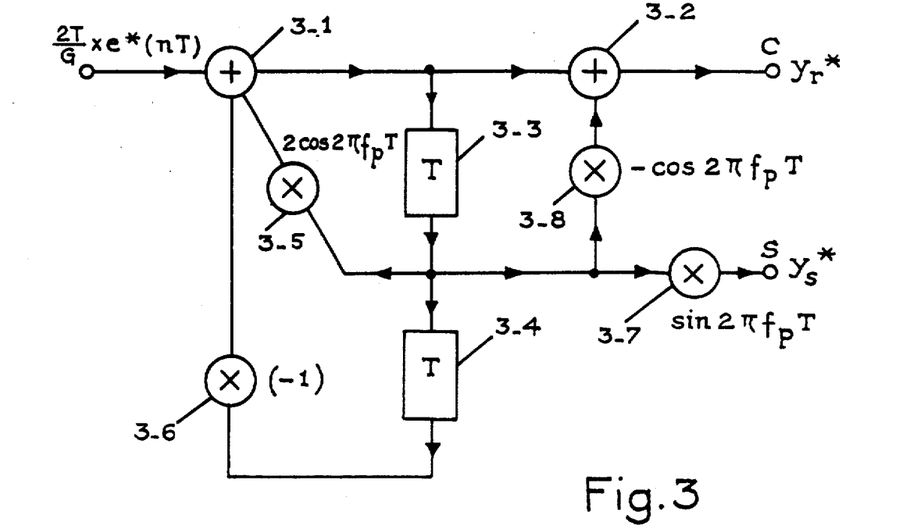

The multiplication factor $\exp(j2\pi f_p T)$ has no physical existence. Moreover, it is necessary to obtain $y_r^*$ and $y_s^*$ simultaneously. It is for this reason that the theoretical perfect resonator shown in FIG. 2 is replaced, in practice, by the perfect resonator shown in FIG. 3, which is functionally identical. Moreoever, it is seen that writing $H_p^*(z)$ with real coefficients in the denominator is as follows:

$$H_p^*(z) = \frac{(1 - z^{-1} \cos 2\pi f_p T) + jz^{-1} \sin 2\pi f_p T}{1 - 2(\cos 2\pi f_p T) \cdot z^{-1} + z^{-2}}$$

and the perfect resonator shown in FIG. 3 comprises a biquadratic recursive digital filter whose denominator possesses two conjugate roots: $\exp(j2\pi f_p T)$ and $\exp(-j2\pi f_p T)$.

This second resonator includes of:

a first adder 3-1 having three inputs and one output, and a second adder 3-2 having two inputs and one output C ("Cosine" Output), the output of adder 3-1 being connected to one of the two inputs of adder 3-2;

first and second delay circuits 3-3 and 3-4 each producing unit delays T, said delay circuits being connected in series;

a first digital multiplier 3-5 of factor $2 \cos 2\pi f_p T$ connected between the output of delay circuit 3-3 and the first of the three inputs of adder 3-1;

a second digital multiplier 3-6 of factor $-1$ connected between the output of delay circuit 3-4 and the second of the three inputs of adder 3-1;

a third digital multiplier 3-7 of factor $\sin 2\pi f_p T$ connected between the output of delay circuit 3-3 and an output S ("sine" output) on which the imaginary part $y_s^*$ of the required signal is obtained;

a fourth digital multiplier 3-8 of factor $-\cos 2\pi f_p T$ connected between the output of delay circuit 3-3 and the second input of adder 3-2.

Adders 3-1 and 3-2 may comprise Texas Instruments 74LS32 Quod 2-input Positive Or-gates. Digital multipliers 3-5 to 3-8 may comprise Texas Instruments 74LS00 Quod 2-input positive Nand-gates. The delay circuits 3-3 and 3-4 may comprise physical inductive delay lines or Texas Instruments 74LS74 Dual Positive Edge Triggered Flip-Flops.

Incoming signal $(2T/G e^*(nT)$ is applied to the third input of adder 3-1.

The real part $y_r^*$ of the required signal is obtained on output C ("cosine" output).

Figure 1B:
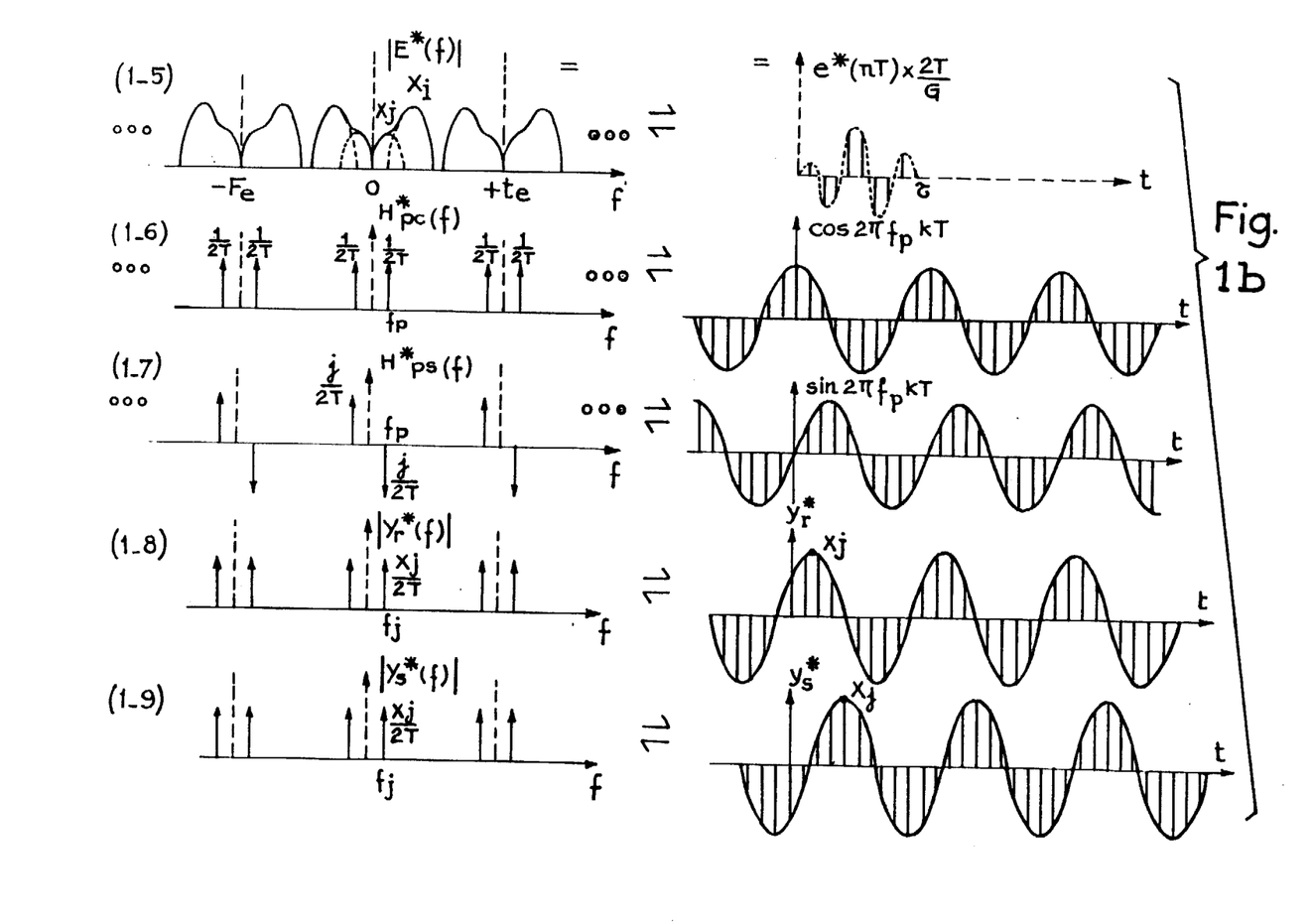

Examination of the parallel changes to signal $e^*(nT)$ and its transform $E^*(f)$ may be continued by referring to FIG. 1b.

The following diagrams are seen in succession in FIG. 1b, which for convenience starts with Diagram 1-5 of FIG. 1a:

In Diagram 1-6, the line spectrum on the left defined by:

$$H_{pc}^*(f) = \frac{1}{2T} \sum_{\lambda=-\infty}^{+\infty} \left[ \delta\left(f - f_p - \frac{\lambda}{T}\right) + \delta\left(f + f_p - \frac{\lambda}{T}\right) \right]$$

and the inverse transform $\cos 2\pi f_p kT$ on the right.

In Diagram 1-7, the line spectrum on the left defined by:

$$H_{ps}^*(f) = \frac{j}{2T} \sum_{\lambda=-\infty}^{+\infty} \left[ \delta\left(f - f_p - \frac{\lambda}{T}\right) - \delta\left(f + f_p - \frac{\lambda}{T}\right) \right]$$

and the inverse transform $\sin 2\pi f_p kT$ on the right.

In Diagram 1-8, on the left the simple product of $Y_r^*(f)$ of $E^*(f)$ shown in 1-5 and the line spectrum of 1-6, and on the right the convolution product of the inverse transforms: $y_r^* = |X(f_p)| \cdot \cos 2\pi f_p kT$ (with $k>N$) when $f_p = f_j$.

In Diagram 1-9, on the left the simple product of $Y_s^*(f)$ of $E^*(f)$ shown in 1-5 and the line spectrum of 1-7, and on the right the convolution product of the inverse transforms: $y_s^* = |X(f_p)| \cdot \sin 2\pi f_p kT$ (with $k>N$) when $f_p = f_j$. Products $y_r^*$ and $y_s^*$, which are the required values, appear on outputs C and S respectively of the perfect resonator shown in FIG. 3.

Figure 4:
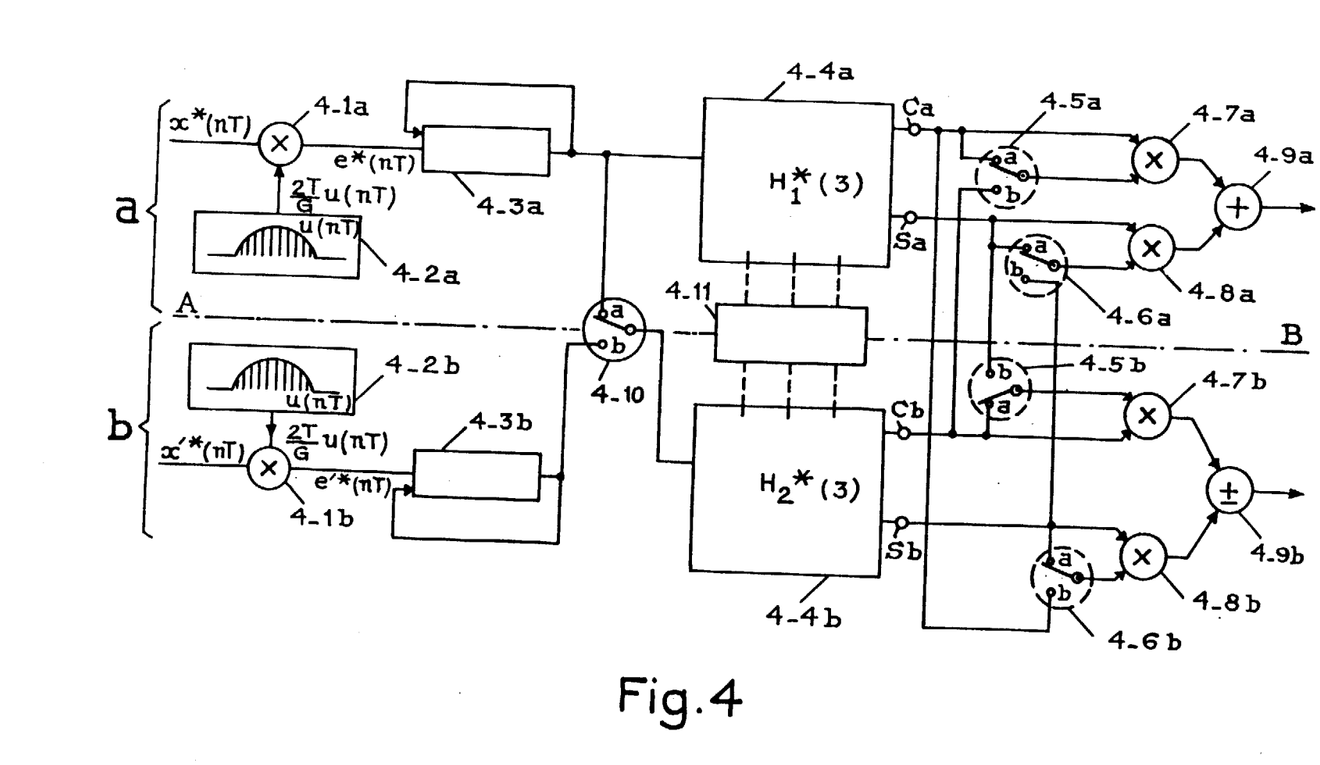
FIG. 4 is a block schematic diagram of an illustrative device for measuring the spectral density specific to a signal x(t) and/or the interaction spectral density of two signals x(t) and x'(t)

FIG. 4 is the diagram of a first illustrative spectral density device according to the invention which allows the simultaneous measurement of the spectral density specific to a signal x(t) for two frequencies $f_1$ and $f_2$ and/or the interaction spectral density of two signals x(t) and x'(t) for a single frequency $f_1$.

It is assumed that both signals have been previously sampled at the frequency $F=1/T$, quantized and encoded.

The circuit diagram shown in FIG. 4 is divided into two halves by the line A-B. Part "A" shows the components of the circuits processing $x^*(nT)$ for frequency $f_1$ and part "B" shows those completely processing $x'^*(nT)$ for the same frequency $f_1$, or partly processing $x^*(nT)$ for another frequency $f_2$.

A temporal digital filter e.g. by multiplier 4-1a in part "a" multiplies the samples $x^*(nT)$ by the amplitudes $(2T/G)u(nT)$ of a limiting gate stored in a read-only memory 4-2a, u(nT) being zero outside of the interval $0 \leq n \leq N-1$ and G representing the maximum amplitude of the transform $U^*(f)$ of u(nT).

Signals $e^*(nT)$ produced by multiplier 4-1a enter a read-write memory 4-3a comprising, for example, a looped shift register which stores N samples of $e^*(nT0$. These N samples are processed by a perfect resonator 4-4a of transfer function $H_1^*(z)$ tuned to frequency $f_1$ and which has, for example, the structure shown in FIG. 3. After a time $\tau = NT$, the required signals $X(f_1) \cos 2\pi f_a kT$ and $X(f_1) \sin 2\pi f_a kT$ are obtained on outputs $C_a$ and $S_a$ of resonator 4-4a.

The right side of part "A" shows two switches 4-5a and 4-6a each having two contacts a and b. Outputs $C_a$ and $S_a$ are connected to contacts a of switches 4-5a and 4-6a, respectively.

The two inputs of a multiplier 4-6a are respectively connected to output $C_a$ and switch 4-5a. Similarly, the two inputs of a multiplier 4-8a are respectively connected to $S_a$ and to a switch 4-6a. The outputs of multipliers 4-7a and 4-8a are added by an adder 4-9a. If switches 4-5a and 4-6a are in position a, the required value $|X(f_1)|^2$ appears on the output of adder 4-9a.

Circuit elements 4-1b, 4-2b and 4-3b in part "B", after having the necessary changes made thereto, are similar to the corresponding circuit elements 4-1a, 4-2a and 4-3a. The output of 4-3b read-write memory is connected to contact b of a 2-position switch 4-10, whose other contact, a, is connected to the output of 4-3a read-write memory. 4-10 switch is connected to the input of another perfect resonator 4-4b of transfer function $H_2^*(z)$ which is tuned:

(a) either to the same frequency $f_1$ as resonator 4-4a when the device is used for measuring the interaction spectral density of signals x(t) and x'(t), switch 4-10 being in position b for this purpose; or (b) to frequency $f_2$ when the apparatus is intended for simultaneously measuring the spectral density specific to x(t) at two frequencies $f_1$ and $f_2$, switch 4-10 then being in position a.

After a time $\tau = NT$, outputs $C_b$ and $S_b$ of resonator 4-4b produce the required signals:

$X(f_2) \cos 2\pi f_2 kT$ and $X(f_2) \sin 2\pi f_2 kT$,
if 4-10 is in position a; and $X'(f_1) \cos 2\pi f_1 kT$ and $X'(f_1) \sin 2\pi f_1 kT$,
if 4-10 is in position b.

The right side of part "b" shows two switches 4-5b and 4-6b, each having two contacts a and b. Outputs $C_f$ and $S_f$ are connected to contacts a of switches 4-5b and 4-6 respectively.

The two inputs of a multiplier 4-7b are respectively connected $C_b$ and switch 4-5b. Similarly, the two inputs of a multiplier 4-8b respectively are connected $S_b$ and to switch 4-6b.

The outputs of multipliers 4-7b and 4-8b add (or subtract) in a switchable device 4-9b, which operates as an adder if switches 4-5a, 4-6a, 4-5b, 4-6b and 4-10 are in position a, or as a subtractor if they are in position b. In the first case, the required value $|X(f_2)|^2$ appears on the output of adder 4-9b.

In order to measure the interaction spectral density, this measurement being made when the five switches are in position b, the following connections are made between the components shown in the right side of parts "a" and "b":

$C_a$ and contact b of 4-6b;
$S_a$ and contact b of 4-5b;
$C_b$ and contact b of 4-5a;
$S_b$ and contact b of 4-6a.

If $\phi$ is the phase difference between the components of x(t) and x'(t) having a frequency $f_1$, the pairs of signals on the inputs of multipliers 4-7a, 4-8a, 4-7b and 4-8b are as follows under these conditions:

on 4-7a: $X(f_1) \cos 2\pi f_1 kT$ and $X'(f_1) \cos (2\pi f_1 kT - \phi)$;
on 4-8a: $X(f_1) \sin 2\pi f_1 kT$ and $X'(f_1) \sin (2\pi f_1 kT - \phi)$;
on 4-7b: $X(f_1) \sin 2\pi f_1 kT$ and $X'(f_1) \cos (2\pi f_1 kT - \phi)$;
on 4-8b: $X(f_1) \cos 2\pi f_1 kT$ and $X'(f_1) \sin (2\pi f_1 kT - \phi)$;

The following is produced on the output of adder 4-9a:

$X(f_1).X'(f_1) \cos \phi$ whilst the following is obtained on the output of circuit element 4-9b which operates in this case as a subtractor:

$X(f_1).X'(f_1) \sin \phi$, which are the two required quantities.

The coefficients of the perfect resonators 4-4a and 4-4b corresponding to frequency $f_1$ or to the pair of frequencies $f_1$ and $f_2$ can be stored in a read-only memory 4-11.

It is necessary to make sure that the delay circuits 3-3 and 3-4 of the perfect resonators 4-4a and 4-4b are reset to zero following the entry of N samples into the read-write memories 4-3a and 4-3b, in order to be able to process a further sequence of N samples either for the same frequencies $f_1$ and $f_2$ or for other frequencies whose coefficients applicable to resonators 4-4a and 4-4b are obtained from the read-only memory 4-11. This zero reset may be performed by means not shown in FIG. 4, using for example, the read-write memories 4-3a and 4-3b themselves.

We shall now give an example of the application of the analysis device according to the present invention to the reception of encoded multifrequency digital signals.

Telephone exchanges use multifrequency signalling codes for signalling between exchanges, or for signalling between a subscriber's telephone and an exchange. These codes typical comprise combinations of two frequencies out of q frequencies (q being 6, 7 or 8).

The principle of operation of most multifrequency receivers is based on the use of selective attenuating filters centered on the frequencies to be detected, or on the calculation of the discrete Fourier transform of a series of N samples of the input signal to be decoded.

Both these methods have disadvantages. The first requires the use of very selective and relatively costly narrow-band filters. The second is suitable for signalling codes whose frequencies are in arithmetic progression, but cannot be used in the case of the codes, which consists of frequencies in geometric progression.

Figure 5:
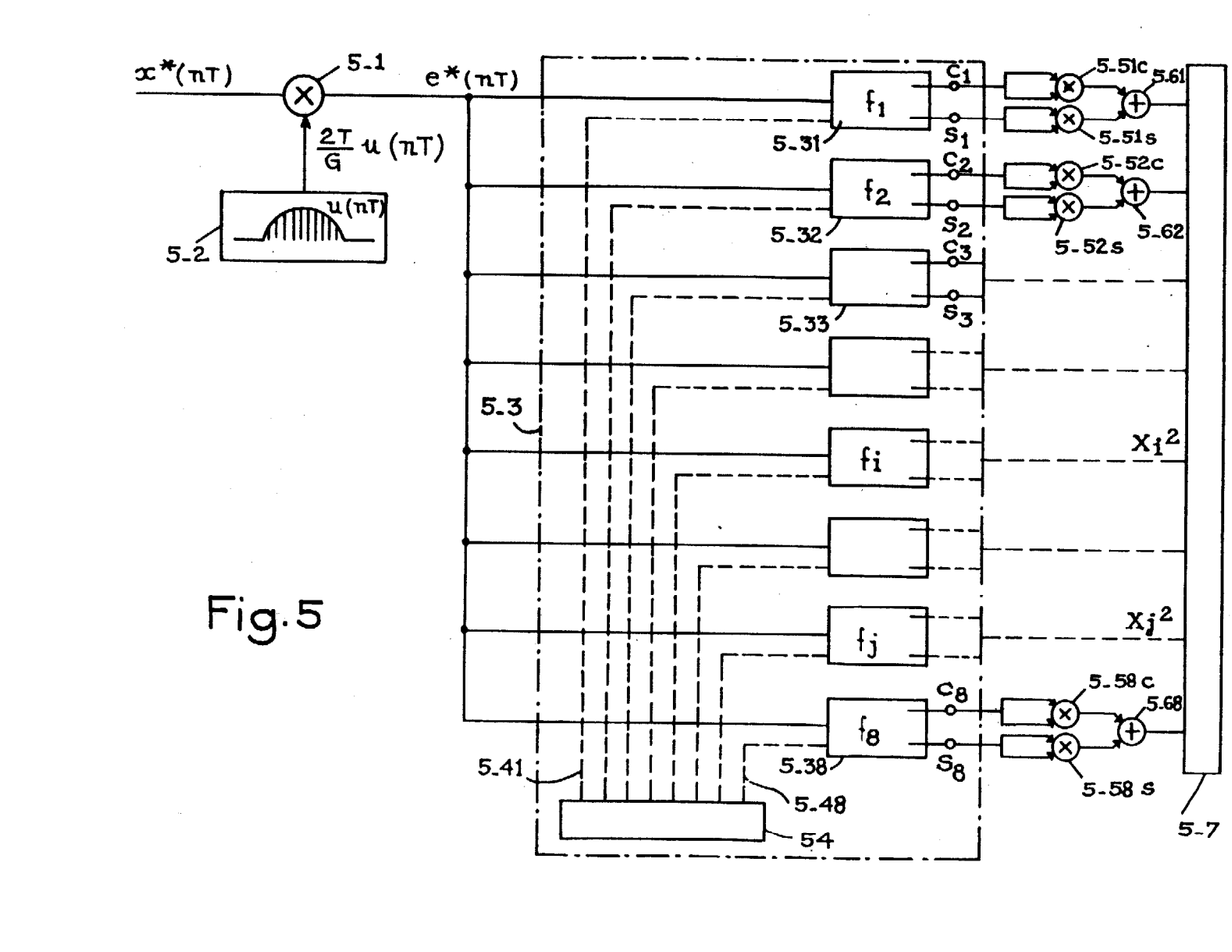
FIG. 5 is a block schematic diagram of another illustrative device for measuring the power spectral density of a digital signal which may be used for the reception and recognition of the frequencies of an encoded multifrequency digital signal.

FIG. 5 is the block diagram of an illustrative frequency analyzer according to the invention for measuring the power level assigned to each of the q (q=8 in the example given) predetermined frequencies.

Signal x(t) is of the form:

$x(t) = X_i \sin 2\pi f_i t + X_j \sin (2\pi f_j t - \phi_{ij}) +$ various residual spurious signals in which $f_1$ and $f_j$ are two of the 8 code frequencies, $X_i$ and $X_j$ are the amplitudes and $\phi_{ij}$ is the phase difference between the sinusoids.

After sampling, with possible quantizing and encoding, the resulting signal x*(nT) is applied to a temporal digital filter comprising a multiplier 5-1, which multiples x*(nT) by the amplitudes (2T/G)u(nT) of a limiting gate contained in a read-only memory 5-2, u(nT) being zero outside of the interval $0 < n < N-1$ and G representing the maximum amplitude of the transform U*(f) of u(nT).

The signals e*(nT) obtained from multiplier 5-1 are processed by a group of 8 perfect resonators 5-3 each having two outputs C and S and designated by 5-31 to 5-38. These resonators are in parallel and each is tuned to one of the eight frequencies of the code being studied. A read-only memory 5-4 contains the coefficient values $2 \cos 2\pi f_p T$, $- \cos 2\pi f_p T$ and $\sin 2\pi f_p T$ for all the frequencies of the various codes which the analyzer is intended to receive. These coefficients are transmitted to the perfect resonators 5-31 to 5-38 by connections 5-41 to 5-48.

The outputs C and S of each perfect resonator are respectively connected to multipliers 5-51c and 5-51s, 5-52c and 5-52s, ... 5-58c and 5-58s.

The outputs of each pair of multipliers are added in adders 5-61, 5-62, ... 5-68.

The required quantities $X_i^2$ and $X_j^2$ are obtained on the outputs of adders 5-6i and 5-6j after a time $\tau = NT$ following the appearance of the first significant sample on the input of multiplier 5-1.

The outputs of the other adders may also produce level indications perceptibly smaller than $X_i^2$ and $X_j^2$. These are, in particular, various spurious signals associated with harmonics $nf_i$ and $n'f_j$ of the code signals, since frequencies $nf_i \pm mF_e$ and $n'f_j \pm m'F_e$ appear in the sampled spectrum and which may be equal to another frequency $f_k$ of the code, or neighbouring frequencies. Because of the design of the system, however, the levels of the spurious signals compared with $X_j^2$ and $X_i^2$ cannot exceed those of harmonics $nf_i$ and $n'f_j$ in the transmitted signal, as defined by the specifications for the various multifrequency code systems.

A logical decision device 5-7 classifies the levels $X_i^2$, $X_j^2$, etc., compares them, and decides if they belong to a code according to the signalling specifition. Logical decision device may comprise a plurality of 74LS$\phi\phi$ Quod dual input Nand-gates.

According to the principle of the present invention, the measurement of $X_i^2$ and $X_j^2$ is obtained after the time $\tau = NT$. Conventional means not shown in FIG. 5 and possibly associated with logical decision device 5-7, should be provided to return the delay circuits of the resonators 5-31 to 5-38 concerned to their initial states when $k \geq N$. The same means should also open the limiting gate which closes after the passage of N samples, i.e. after the time $\tau$. The choice of the instant $MT > NT$ for returning to the initial state is left to the discretion of the user, since in principle $X_i^2$ and $X_j^2$ no longer vary after time NT.

We will now give a second example of the use of an analysis device according to the present invention for the reception of encoded multifrequency digital signals.

The digital signals of the multifrequency codes mentioned in the first example have a sampling frequency $F_e=1/T=8000$ Hz greater than four times the highest frequency of the code frequencies to be detected (1980 Hz for the "$R_2$" code). There are, therefore, more than four samples per period for representing the temporal signals of the code frequencies detected, and theoretical analysis shows that it is sufficient to observe the phenomena on the "cosine" or "sine" outputs of the perfect resonators shown in FIG. 3.

Figure 6:
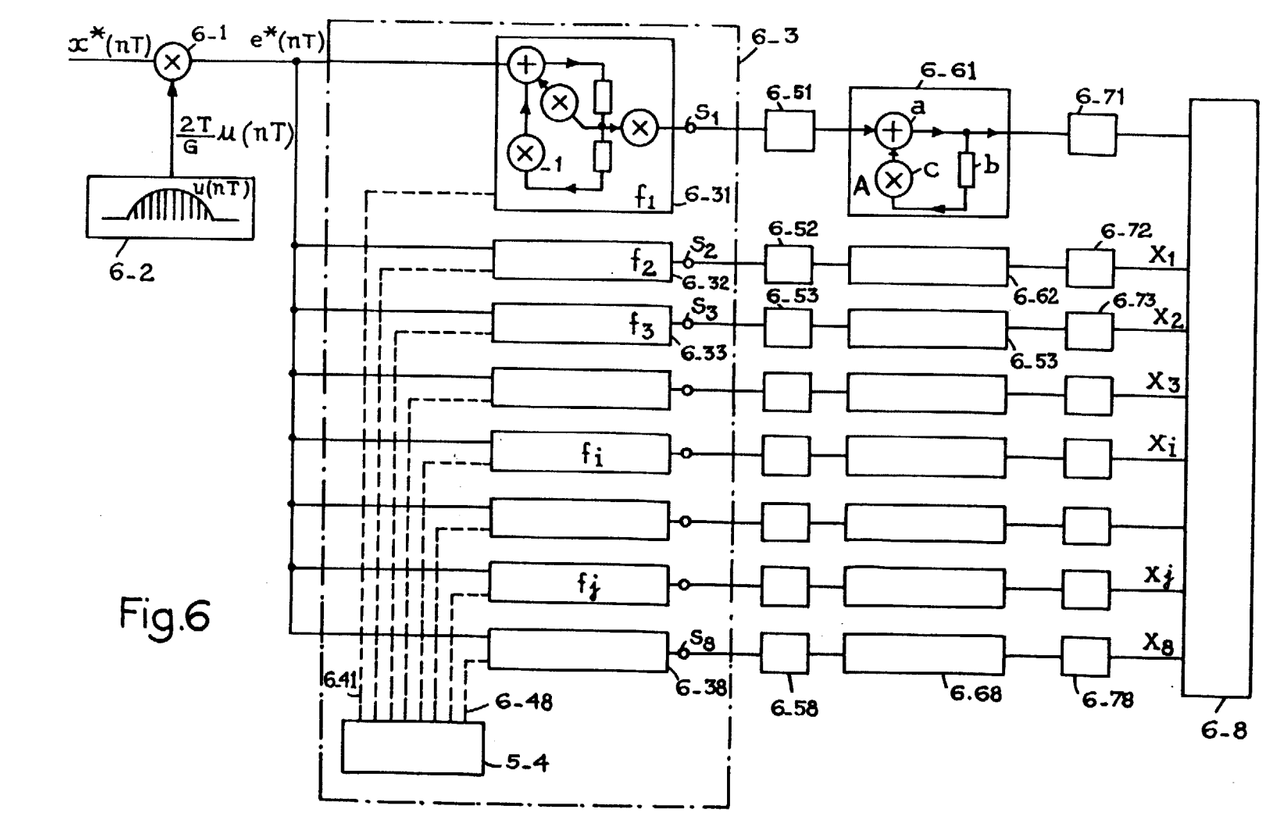
FIG. 6 is a block schematic diagram of another illustrative device for measuring spectral component amplitudes which may be used for the same purpose as the apparatus shown in FIG. 5.

FIG. 6 is the block diagram of another illustrative frequency analyzer for measuring the relative amplitudes of the sinusoids which carry the q predetermined code frequencies.

As in the first example, signal x(t) is of the form:

$x(t)=X_i \sin 2\pi f_i t + X_j \sin (2\pi f_j t - \phi_{ij})$ + various residual spurious signals and is processed by circuit components 6-1 and 6-2 which are similar to the homologous circuit devices 5-1 and 5-2 discussed with reference to FIG. 5.

The signals e*(nT) produced by multiplier 6-1 are processed by a group of 8 substantially identical perfect resonators 6-31 to 6-38, shown in rectangle 6-3, each possessing a single output, the "sine" output designated by $S_1, S_2 \ldots S_8$. These resonators are in parallel, and each is tuned to one of the 8 code frequencies being studied.

Inside the deliberately enlargened rectangle 6-31 are shown the resonator components. They differ from the arrangement shown in FIG. 3 in that adder 3-2 and multiplier 3-8. Are not needed and, therefore are omitted.

The other resonators 6-32 to 6-38 are configured in the same manner as resonator 6-31.

A read-only memory 6-4 contains the values of the two coefficients $2 \cos 2\pi f_p T$ and $\sin 2\pi f_p T$ for all the frequencies of the various codes which the analyzer is intended to receive. These coefficients are transmitted to perfect resonators 6-31 to 6-38 by connections 6-41 to 6-48.

The description of the operation of the analyzer shown in FIG. 6, from the input x*(nT) to outputs $S_1$ to $S_8$, is similar to that already given above for the analyzer shown in FIG. 5.

Signal x(t) is of the form:

$x(t)=X_i \sin 2\pi f_i t + X_j \sin (2\pi f_j t - \phi_{ij})$ + various residual spurious signals. The following sampled signals are obtained on outputs $S_i$ and $S_j$ of resonators 6-3i and 6-3j:

$y_i^* = X_i \sin 2\pi f_i kT$ and $y_j^* = X_j \sin 2\pi f_j kT$ for $k \geq N$, i.e. after a time $\tau = NT$ representing the total width of the time gate 6-2.

From k=0 (initialization) to k=N, the digital signals on outputs $S_i$ and $S_j$ are approximately represented by:

$y_i^* = \epsilon_i \sin 2\pi f_i kT$ $y_j^* = \epsilon_j \sin 2\pi f_j kT$ with $\epsilon_i$ and $\epsilon_j$ increasing exponentially from 0 to $X_i$ and from 0 to $X_j$ as k varies from 0 to N.

The device shown in FIG. 6 are advantageously provided with means for extracting the digital values $X_i$ and $X_j$. These means, shown in the right side of the figure, are in fact digital amplitude detectors.

Each of the outputs $S_1$ to $S_8$ is connected to the input of a digital rectifying circuit, such as rectifiers 6-51, 6-52, ... 6-58, which produces on its output the absolute value of each sample of the input signal.

The 8 outputs of circuits rectifiers 6-51 to 6-58 are respectively connected to the input of a plurality of low-pass digital filters 6-61 to 6-68. The structure of these digital filters is shown inside the deliberately enlargened rectangle filter 6-61. 6-61 comprises an adder a with two inputs, of which one is fed with the digital signals obtained from rectifier 6-51, and an output; a delay circuit b of unit delay T and connected between the output of a and the input of a multiplier c having a coefficient A ($A \leq 1$) whose output is connected to the other input of adder a. These filters are of the first-order, recursive type having the following transfer function expressed in terms of z:

$$D^*(z) = \frac{z}{z-A}$$

The pulse response of such a filter is the sampled exponential:

$$d^*(kT) = \sum_{k=0}^{\infty} e^{k \log A} \delta(t - kT)$$

and on the output of filter 6-6i, for example, the digital signal is equal to the convolution product of $y_i^*$ and d*(kT). For k>N, this product tends to the required value $X_i$ (multiplied by $2/\pi$) with amplitude variations which are greater or lesser depending on whether A is more or less distant from its maximum value 1, which corresponds to the stability threshold of filters 6-61 to 6-68. Each of the filters 6-61 to 6-68 may be followed by a circuit producing the arithmetic mean, such as averaging circuits 6-71, 6-72, ... 6-78, thereby "smoothing" the digital signals produced by the said filters averaging circuits 6-71 to 6-78 may comprise a plurality of 74LS193 4-bit up/down counters and a plurality of 74LS32 Quad 2-1 input positive OR-gates.

A logical decision device 6-8 classifies the amplitudes $X_i$, $X_j$, etc., compares them and decides if they belong to a code according to specification signalling. Logical Decision Device 6-8 may comprise a plurality of 74LS$\phi\phi$ Quod dual input Nand-gates.

The further A is different from 1, the longer the acquisition time of $X_i$ and $X_j$. In all cases, it the acquisition time exceeds the minimum value $\tau = NT$. The effective time of the measurement is therefore longer than that required by the device shown in FIG. 5. The advantage of the present device is that it reduces the number of multiplications per unit time required for acquiring values $X_p$.

Although the principles of the present invention are described above in relation with specific practical examples, it should be cearly understood that said descriptions are given as examples only and do not limit the scope of the invention.

I claim:

1. A digital device for analyzing the spectrum of a signal X(t), said signal having the spectral transform X(f), $-Fe/2 < f < Fe/2$, and previously having been sampled at a frequency Fe=T, and linearly quantized and encoded to produce a digital series X* (nT), said device measuring the power spectral density of said signal and including:

(a) a limiting gate of width $\tau = NT$ connected to the input of the device for processing the incoming signal $X^*(nT)$;

(b) a perfect digital resonator, including first and second delay circuits each of delay T, connected to said limiting gate, said resonator having a first output S, known as the "sine" output and a second output "C" known as the "cosine" output; and (c) a read-only memory connected to said resonator, said memory storing q group of three coefficients, $2 \cos 2\pi \text{ fpT}$, and $\sin 2\pi \text{ fpT}$, respectively, corresponding to the q frequencies of the analysis, characterized in that the device further comprises:

(d) at least one read-write memory comprising a looped shift-register inserted between the output of said limiting gate and the input of said perfect resonator for storing N samples of said signal; and (e) means, connected to said first and second delay circuits in said perfect resonator, for resetting said delay circuits after the passage of the N samples stored in said read-write memory.

2. A digital device according to claim 1 for measuring the interaction spectral density of two signals, $x(t)$ and $x'(t)$, having the spectral transforms $X(f)$ and $X'(f)$ respectively, for q frequencies $f_p$, said device including:

first and second substantially identical channels respectively processing signals $x(t)$ and $x'(t)$, each channel including, according to the teachings of claim 1, a limiting gate, a digital perfect resonator connected to a read-only memory storing the q groups of three coefficients corresponding to the q frequencies of the analysis, a read-write memory comprising a looped shift register inserted between the said limiting gate and the input of the said perfect resonator for storing N samples of said signal, and means for resetting the perfect resonator after the passage of the N samples stored in the read-write memory; characterized by:

(f) first, second, third and fourth digital multipliers each having two inputs of the said first multiplier being connected to C and C', the inputs of said second multiplier being connected to S and S', the inputs of the third multiplier being connected to S and C', and the inputs of the fourth multiplier being connected to C and S', C and S respectively comprising the "cosine" and "sine" outputs of said first channel (processing $x(t)$) and C' and S' respectively comprising the "cosine" and "sine" outputs of said second channel (processing $x'(t)$);

(g) an adder connected to the outputs of said first and second multipliers the output of said adder producing the in-phase part $R_p$ of the interaction spectral density at frequency $f_p$;

(h) a subtractor connected to the outputs of said third and fourth multipliers, the output of said subtractor producing the quadrature part $I_p$ of the interaction spectral density at frequency $f_p$.

3. A digital device in accordance with claim 1 for receiving encoded multifrequency signals each comprising the sampled, quantized and linearly encoded sum of several sinusoids of the form $X(f_p) \sin 2\pi f_p T$, whose frequencies $f_p$, defining a signalling code, are selected out of q predetermined frequencies, said device including q perfect digital resonators connected in parallel, each having first and second delay circuits and being tuned to one of the frequencies $f_1, f_2 \ldots f_q$ of the code, the "sine" output of each resonator being connected to a digital rectifier (6-51) thence to a digital low-pass filter (6-6) whose output produces the amplitude $X(f_p)$ and a decision logic circuit (6-8) connected to the output of the low-pass filter which receives, classifies and compares the acquired values $X(f_p)$, characterized in that said device further includes:

(i) means connected to and functionally associated with said decision logic circuit, for resetting the first and second delay circuits of the perfect resonators concerned, and for reopening said limiting gate at the instant MT after time NT.

4. A digital device, in accordance with claim 1, for receiving encoded multifrequency signals, said device including q perfect digital resonators (5-31) connected in parallel, each having first and second delay circuits and being tuned to a frequency $f_1, f_2, \ldots f_q$ of the code; q digital squaring circuits (5-51S) each having an input connected to output S of a corresponding one of the perfect digital resonators, q digital squaring circuits (5-51c) each having an input connected to output C of a corresponding one of the perfect digital resonators, q 2-input adders (5-61) connected to the outputs of the corresponding digital squaring circuits associated with the same perfect resonator, and a decision logic circuit connected to the outputs of said q adders which receives, classifies and compares the values $X^2(f_p)$ acquired on the outputs of the q adders, characterized in that said device further includes:

(j) means connected to and functionally associated with said decision logic circuit, for resetting the first and second delay circuits of the perfect resonators concerned, and for reopening said limiting gate at the instant MT after time NT.

5. A digital device in accordance with claim 1 or 2 or 3 or 4, wherein said limiting gate of width $T = NT$ has a weighting curve $u(nT)$, symmetrical about $N/2T$ and a maximum amplitude of 1 for NT/2, and zero outside of the interval 0 to (N-1)T, characterized in that said limiting gate comprises at least one multiplier (4-1) which forms the product of the amplitude of each sample, according to its rank, and the quantities $(1/Ku)(nT)$, said quantities being stored in a read-only memory (4-2), K being equal to G/2T and G measuring the amplitude of the spectral transform of $u(nT)$.

6. A digital device in accordance with claim 3 or 4, characterized in that the width $T = NT$ of said limiting gate is selected to be equal to, or greater than, $$\frac{a}{\Delta f_{ij} - \Delta f_p},$$

wherein a is a coefficient lying between 1 and 3, depending on the type of gate used, $\Delta f_{ij}$ is the spacing between the closest pair of frequencies in the code considered, and $\Delta f_p$ is the tolerance with respect to values $f_1, f_2, \ldots f_q$ in the received signal frequencies.

* * * * *